Figure 1:
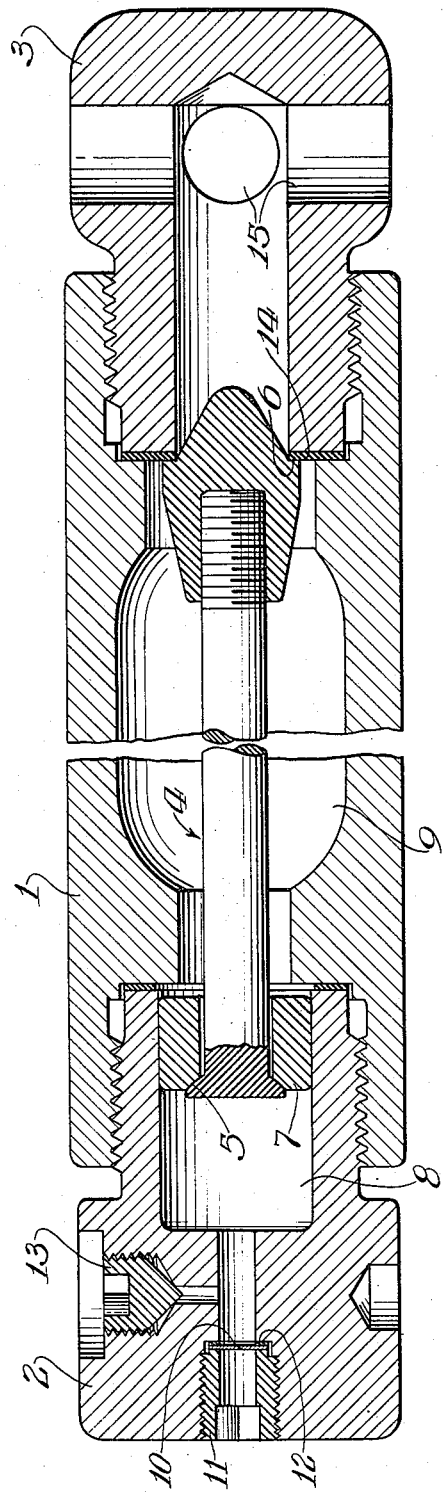

Aug. 27, 1940.  F. H. ARMSTRONG  2,212,891
BLASTING DEVICE
Filed May 29, 1933  2 Sheets-Sheet 1

Inventor
Frank H. Armstrong
By Allyn Harris Atty.

Aug. 27, 1940.  F. H. ARMSTRONG  2,212,891
BLASTING DEVICE
Filed May 29, 1933  2 Sheets-Sheet 2
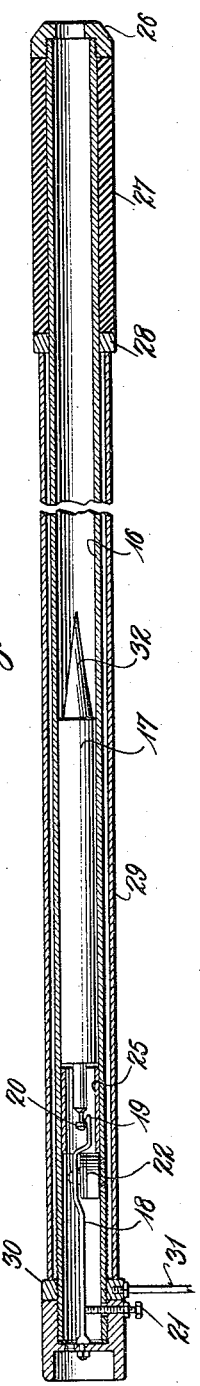
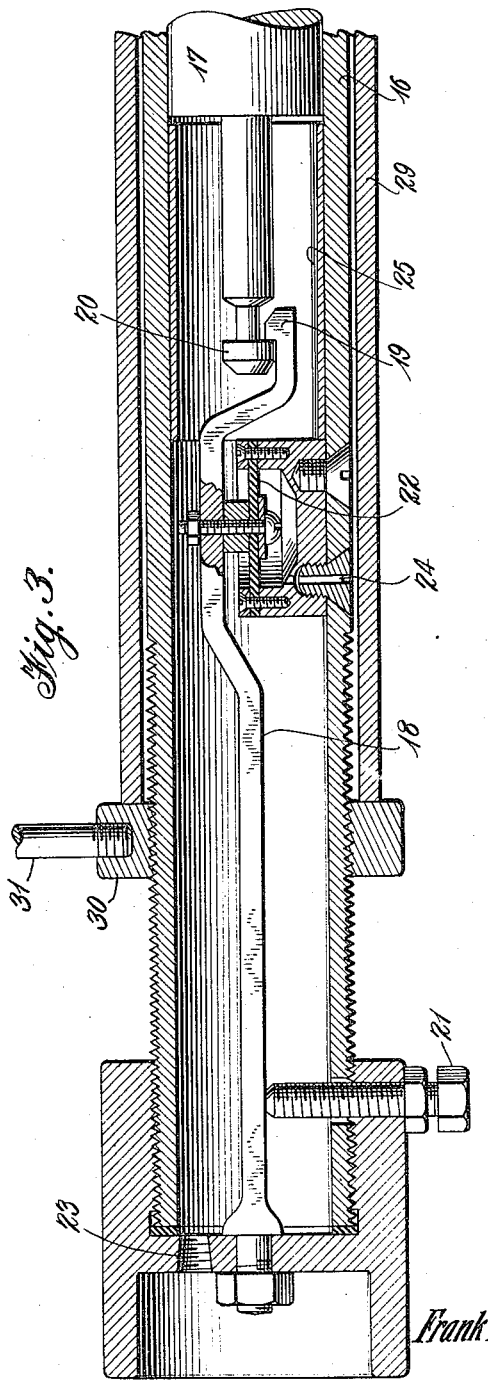
Inventor
Frank H. Armstrong
By L. Donald Myers
Attorney Patented Aug. 27, 1940

2,212,891

UNITED STATES PATENT OFFICE 2,212,891

BLASTING DEVICE

Frank H. Armstrong, Chicago, Ill., assignor to Cardox Corporation, a corporation of Illinois Application May 29, 1933, Serial No. 673,385

18 Claims. (Cl. 102—6)

This invention relates to a new and improved blasting device designed more particularly with reference to the requirements of coal blasting but applicable by reason of its inherent absolute safety and extremely low cost of operation to many other fields of work wherein ordinary blasting methods are commonly employed.

More particularly the invention is concerned with a blasting device of the type illustrated in Patent 1,895,563 and the object is to provide an improved means for effecting release of a charge of compressed air or other medium from the cartridge.

Broadly, the object of the invention is to perfect a blasting device according to the principles of the above mentioned patent, providing absolute safety and the utmost in operating economy.

Referring to the drawing, Figure 1 is a view in longitudinal section through a cartridge embodying a typical form of release mechanism in accordance with the present invention.

Figure 2 is a longitudinal sectional view of the gun employed for firing the cartridge disclosed in Fig. 1, and Figure 3 is an enlarged view in longitudinal section illustrating the mechanism of the device shown in Fig. 2.

The cartridge body 1 is provided with caps 2 and 3, the former being designated a terminal cap and the latter a discharge cap. A valve 13 is provided in the terminal cap for the purpose of permitting the introduction of a charge of compressed air or other gas into the charge containing chamber formed within the cartridge intermediate the ends thereof. The discharge mechanism consists essentially of a differential valve mechanism generally indicated at 4. The valve member is designed to seat as indicated at 6 on a gasket 14 positioned between the end surface of the discharge cap 3 and the adjacent sealing surface formed in the cartridge body. This valve member is carried on the end of a rod which extends throughout the length of the cartridge and terminates in a flat head disposed within a chamber 8 formed in the terminal cap.

The chamber 8 is in the form of a cylindrical bore formed in terminal cap 2 and slidably fitting within this bore is a collar 7 which functions somewhat as a plunger or piston. It will be observed that substantial clearance is provided between the bore of collar 7 and the rod thus permitting under certain conditions the free passage of air or other gas from chamber 8 into the main chamber 9 of the cartridge. It will be observed also that the head of the rod and the collar 7 are provided with mating sealing surfaces indicated at 5, which surfaces under certain conditions cooperate to prevent the passage of compressed air or other gas from chamber 9 into chamber 8.

There is provided in the end of the terminal cap a bore of small diameter which communicates with chamber 8. This bore is normally closed by means of a thin disc 10 which is maintained in sealing position on a gasket 12 by means of a suitable nut 11. It may be mentioned at this point that the puncturing of disc 10 serves to vent chamber 8 to the atmosphere. The function of this action will be later described.

For the charging of this type of cartridge a suitable clamp may be applied to the pocket formed in the terminal cap 2 immediately surrounding the charging valve 13. This clamp may be provided with a suitably packed wrench designed to screw the valve 13 outwardly thereby removing its point from the mouth of the port which communicates with the axial bore and chamber 8. Suitable air or gas passages are provided to permit the passage of air by or through the threads of the charging valve 13. Under these circumstances assuming the charging clamp to be connected to a source of high pressure air or gas, there will be a free flow of such air or gas into chamber 8. The immediate result of the introduction of high pressure air into chamber 8 is to move both the valve rod and the collar 7 in an axial direction. This movement of the valve rod results in seating of the valve member on the gasket 14 at the discharge end of the cartridge. The collar 7 instantly moves in an axial direction until it comes into contact with the adjacent shoulder formed in the body of the cartridge, thus resulting in separation of the mating sealing surfaces indicated at 5. With the parts in this relation the high pressure air or gas is free to flow around the rod and through collar 7 into the main chamber 9 of the cartridge. In this manner a complete charge of desired proportions may be introduced into the main chamber of the cartridge and when such a charge has been so introduced the valve 13 may be closed thereby preventing the escape of the charge from chamber 8. The valve at the discharge end of the cartridge, of course, maintains its sealed relation as indicated at 6 and prevents the escape of the charge through the discharge cap.

In order to actuate the valve at the discharge end of the cartridge into position to permit the free escape of the charge from chamber 9 through ports 15 of the discharge cap it is merely necessary to vent chamber 8 to the atmosphere as suggested above by merely puncturing the small metal disc 10. The puncturing of this disc 10 results in the immediate reduction in pressure within chamber 8 thus giving rise to an unbalanced pressure relation as regards the pressures acting on opposite faces of the collar 7. It is apparent that the instantaneous reduction of pressure within chamber 8 results in a preponderance of pressure acting on the opposite face of collar 7 from the high pressure air contained in the main chamber 9 of the cartridge. This unbalanced pressure relation results in an immediate axial movement of the collar 7 in a direction to bring about sealing engagement of the mating surfaces 6. The sealing of these surfaces, of course, prevents equalization of pressures in chambers 9 and 8 because the compressed air or gas within chamber 9 is unable to escape into chamber 8. The axial movement of collar 7 does not stop, however, when it has engaged with its mating surface on the valve rod but continues in the same direction under the preponderance of pressure in chamber 9 thus causing rapid axial movement of the rod and, of course, also of the valve carried on the end thereof. It is apparent therefore that the puncturing of disc 10 results in a complete opening of the valve member thereby permitting the entire charge contained within chamber 9 to escape freely through the axial bore and radial ports 15 of the discharge cap. Although this description indicates that there is a sequence of operations within the cartridge following the puncturing of disc 10, the final result is in fact practically instantaneous.

The repeated use of the cartridge involves only the replacement of a new disc 10 for the previously punctured disc and the introduction of a fresh charge of compressed air through the valve 13.

Hence, there is provided an extremely simple cartridge which is most economical in operation, the cost of replacement of disc 10 and of the compressed air and the labor of introducing the compressed air being the only expense items connected with the use of the cartridge over a practically indefinite period of time. It will also be observed that the cartridge provides absolute safety even under the most hazardous conditions such as in extremely gaseous coal mines. It does not involve any manner of combustion or the use of heat, chemicals or electricity. Moreover, it is substantially foolproof in that it does not involve a mechanical release mechanism subject to accidental tripping or other manner of inadvertent discharge. It should be mentioned in this connection that the disc 10 may be adequately protected if such protection should be deemed desirable by merely threading or otherwise inserting a suitable closure element in the threaded plug 11. It is conceivable, of course, if the opening in plug 11 were left open an accidental puncturing of disc 10 might occur. However remote this sole element of danger may be it is entirely possible to obviate it in the manner indicated.

In the use of this cartridge, for example, in blasting coal it is contemplated that there will be provided a suitable mechanical means operable from a remote point for puncturing the disc 10 to cause discharge of the cartridge. It should be readily appreciated that the puncturing of the disc 10 by remote control may be accomplished in a number of different ways. The particular means contemplated for this purpose, which has been tried and found successful, consists of a simple air gun designed to be placed in the drill hole adjacent the terminal cap 2 of the cartridge and secured to such terminal cap if this should seem desirable. The plunger of the gun carries a small chisel or other pointed element for puncturing the disc 10. This plunger is normally retained in retracted position by means of a latch which in turn is controlled by a diaphragm responsive to the pressure introduced into the gun. The sole object, of course, is to build up a pressure on the plunger of the air gun and then suddenly release this plunger to permit it to be actuated by the built up pressure thereby causing it to strike a sudden blow sufficient to puncture the disc 10.

The air gun described above is fully disclosed in applicant's copending application Ser. No. 647,785 filed December 17, 1932. The features of construction of this gun will be described again with reference to Figures 2 and 3 of the drawing.

The compressed air gun disclosed in Figures 2 and 3 includes a long steel cylinder 16 in which is positioned a plunger 17. A pressure responsive latch member 18 is provided to retain the plunger in initial position until the pressure thereon is built up to a predetermined point wherein the latch is automatically disengaged from the plunger and the latter rapidly moves toward the end of the cylinder under the force of the pressure imposed thereon. This latch member consists of a long spring arm having a hooked end 19 designed to engage a shoulder 20 formed on the reduced portion of the plunger. The tension of this spring arm may be adjusted by means of a bolt 21 extending through the cylinder. The spring latch normally tends to engage and retain the plunger in position but is adapted to be actuated to release the plunger by means of a diaphragm 22 which is responsive to the pressure introduced into the cylinder. Thus the cylinder may be connected as at 23 to a source of compressed air or other gas at suitable pressure preferably in the neighborhood of 100 lbs. per square inch and compressed air may be delivered into the chamber in order to build up therein the desired pressure for actuating the plunger. If this desired pressure is predetermined at say 100 lbs. per square inch the diaphragm 22 will at this point be operated to move the latch 19 out of engagement with the shoulder of the plunger, and the latter, which will at this point be under an accumulated pressure of 100 lbs. per square inch, will be forcibly projected toward the end of the cylinder which lies adjacent to the cartridge to be discharged. The diaphragm chamber is suitably vented as indicated at 24 in order to prevent the trapping of air. Within the cylinder there is provided a spacing sleeve 25 which serves to limit the travel of the plunger in one direction. The travel of the plunger in the opposite direction is limited by the inwardly extending shoulder of the cap member 26 threaded on one end of the cylinder.

In order to firmly anchor this actuating device in the drill hole there is provided on one end of the cylinder an expansible rubber sleeve 27 one end of which abuts against the cap member 26 above mentioned and the other end of which is engaged by a slidable ring 28. Surrounding the remaining portion of the cylinder 16 there is provided a tubular member 29 designed to be actuated in a longitudinal direction by means of a nut 30 threaded on the exterior of the cylinder 16. This nut may be rotated by any suitable means such, for example, as a rod 31 threaded thereon. By sufficient movement of the tubular sleeve 29 in a longitudinal direction by means of the nut, the rubber sleeve 27 may be expanded, within limits, to any suitable diameter and thus cause it to forcefully engage the rough and irregular surface of the drill hole wall. This provides an exceptionally good seal against the escape of energy release by the cartridge and at the same time serves efficiently to prevent ejection of the cartridge from the drill hole.

The plunger 17 is provided with a chisel 32 which, when the plunger is released, will be actuated to puncture the disk 10 of the cartridge shown in Figure 1.

It should be understood the particular form of differential valve herein disclosed is but one of many forms capable of serving the purposes of the present cartridge. In fact several forms have been developed but I have illustrated herein only the simplest and most efficient of the various forms and it is intended that this disclosure shall be considered as typical and not as presenting the sole structural solution to the problem involved.

In the blasting of coal or other material by means of cartridges of this type the pressure employed will vary from 500 to 10,000 pounds per square inch. It should be understood, however, that these minimum and maximum figures are indicative merely of the normal range of pressures and that there is no limitation on the type of cartridge shown such as would prohibit the use of pressures substantially below and substantially above these limits. It is apparent, of course, that a charge of compressed air or other gas at any pressure whatever within the limits of the physical strength of the cartridge may be used to meet particular conditions. The charging and charge releasing mechanisms of the cartridge are not dependent in any way upon pressure of a particular value. As regards the air gun referred to above it has been found that pressures in the neighborhood of 100 pounds per square inch are quite suitable for this purpose. In practice the air gun will be connected by tubing to a suitable source of compressed air at approximately 100 pounds per square inch pressure and there will be provided at or adjacent this source of compressed air a suitable valve for permitting the flow of the air to the air gun. Thus, the operation of the cartridge from any desired point however remote from the location of the cartridge and the work which it is to perform involves merely the provision of a suitable length of tubing for carrying the 100 pound pressure of air from the source of supply to the air gun. The cartridge itself will probably be charged at some central plant either within or without the mine and will then be transported to the point where it is to be used.

I claim:

1. A material breaking device comprising a cartridge body adapted to receive and confine a fluid charge and having a discharge orifice, a valve for controlling said discharge orifice, means for causing said valve to be initially closed and subsequently opened by force exerted by the fluid charge, and means for conditioning the fluid charge to cause it to perform the valve opening operation.

2. A material breaking device comprising a cartridge having a chamber adapted to receive a charge of highly compressed air or other gas and a discharge opening through which said charge may escape, and a differential valve within said chamber for controlling said discharge opening.

3. A material breaking device as defined in claim 2 further characterized in that the said differential valve is controllable from a remote point.

4. A material breaking device comprising a cartridge having a chamber adapted to receive a charge of highly compressed air or other gas and a discharge opening through which said charge may escape, a differential valve within said chamber for controlling said discharge opening, and means for establishing differential pressures calculated to open said valve.

5. A cartridge having a charge receiving chamber and a discharge orifice, a valve adapted to seal said orifice and pneumatic means governing the position of said valve.

6. A cartridge having a chamber adapted to receive a charge of gas at working pressure, and a repeatedly reusable valve reciprocable bodily between positions within said chamber in which it respectively seals the charge in said chamber and permits discharge of said charge therefrom, and means constructed and arranged and subject to remote control for moving said valve from its sealing position to its discharging position to release said charge.

7. A cartridge having a fluid charge receiving chamber, a discharge orifice for the chamber, and a fluid receiving control chamber; a valve in operative relation to said orifice for controlling the latter, means operatively connected to said valve and positioned in said control chamber and responsive to relatively different fluid pressures in said charge receiving chamber and control chamber for effecting opening and closing movements of said valve, and means for creating said relatively different fluid pressures.

8. In combination, a pre-charged blasting cartridge comprising a container for receiving a blasting charge at a predetermined blasting pressure, a valve for controlling the discharge of said charge from said container, a control piston for said valve, and a control chamber containing said piston, and means operable at the will of the operator and operative subsequent to the positioning of the container in a blast hole for venting said control chamber to effect movement of said piston to open said valve.

9. In a pre-charged blasting cartridge, a container for receiving a blasting charge at a predetermined pressure, a differential valve mechanism for controlling the discharge of the blasting charge from said container and including a valve, pressure operated valve actuating means, and a pressure receiving control chamber adapted to receive a part of the valve actuating means and to be vented to effect actuation of the valve mechanism, and means under the control of the operator and operative subsequent to the positioning of the cartridge in a blast hole in the material to be broken for effecting venting of said control chamber.

10. In a blasting cartridge, a cylindrical casing for receiving a blasting charge, a discharge cap at the inner end of said casing and having a discharge orifice, a control cap at the outer end of the casing and having a control chamber, a valve in the casing for controlling said discharge orifice, a piston reciprocable in said control chamber, a rod connected to said valve and actuated by said piston to open said valve, and means for venting said control chamber to effect movement of said piston to release said valve.

11. In a blasting cartridge, a cylindrical casing for receiving a blasting charge, a discharge cap at the inner end of said casing and having a discharge orifice, a control cap at the outer end of the casing and having a control chamber, a charging valve carried by said control cap whereby said cartridge may be pre-charged to a predetermined blasting pressure, a valve in the casing for controlling said discharge orifice, a piston reciprocable in said control chamber, a rod connected to said valve and actuated by said piston to effect valve opening, and means for venting said control chamber to effect movement of said piston to release said valve.

12. In a blasting cartridge, a cylindrical casing for receiving a blasting charge, a discharge cap at the inner end of said casing and having a discharge orifice, a control cap at the outer end of the casing and having a control chamber, a valve in the casing for controlling said discharge orifice, a piston reciprocable in said control chamber, a rod connected to said valve and actuated by said piston to effect valve opening, and a rupturable member operable at will and controllable from a remote point for venting said control chamber to effect movement of said piston to release said valve.

13. A material breaking device comprising a cartridge body having a fluid pressure charge receiving chamber therein and a discharge orifice, and means for controlling said discharge orifice including a valve, fluid pressure operated controlling means for the valve operative on supply of fluid pressure to the cartridge body to close said valve and on release of a part of the fluid charge from the cartridge body to effect valve opening and release of the balance of the charge, and means for effecting release of said part of the fluid charge.

14. A material breaking device comprising a cartridge body having a charge receiving chamber therein and a discharge orifice, a valve controlling said orifice, said cartridge having a control chamber also therein having a passage communicating therewith through which pressure may be supplied to said control chamber and through which pressure may be vented from said control chamber, means for controlling the admission and venting of pressure through said passage, and means for controlling said valve including means providing oppositely facing pressure areas and operatively connected with said valve and reciprocably disposed in said control chamber.

15. A material breaking device comprising a cartridge body having therein a control chamber at one end thereof, a charge receiving chamber occupying the central portions thereof and a discharge orifice at the other end thereof, a valve controlling said orifice, and means for controlling said valve disposed in said control chamber and operatively connected with said valve.

16. A material breaking device comprising a cartridge body having a charge receiving chamber therein a discharge orifice, and a valve controlling said orifice and moved to closed position upon supply of pressure to said cartridge and having an area subjected to the pressure within said chamber upon which chamber pressure acts in a direction to maintain said valve closed, and means for effecting opening of the valve.

17. In a blasting cartridge, a container for receiving a blasting charge, a valve for controlling the discharge of the blasting charge from said container, a differential piston for controlling said valve, a control chamber forming a part of the cartridge for containing said piston, and a quick acting venting device for venting said control chamber to effect movement of said piston to open said valve.

18. A blasting cartridge comprising a substantially cylindrical container adapted to receive a high pressure charge and having a discharge opening adjacent one end thereof, valve means closing said opening, releasable means adjacent the other end of said container holding said valve means in said opening and manually operable means operative from a point remote from the cartridge for effecting release of said releasable means.

FRANK H. ARMSTRONG.